(12) United States Patent
Skiba et al.

(10) Patent No.: US 7,041,405 B2
(45) Date of Patent: May 9, 2006

(54) FUEL CELL VOLTAGE CONTROL

(75) Inventors: Tommy Skiba, East Hartford, CT (US); David D. Jayne, Manchester, CT (US); Paul A. Grubb, Somers, CT (US); Rishi Grover, Vernon, CT (US); Timothy M. Remmers, New Hartford, CT (US); Wesley E. Sedlacek, Jr., South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 370 days.

(21) Appl. No.: 10/681,493

(22) Filed: Oct. 7, 2003

(65) Prior Publication Data

US 2005/0074649 A1 Apr. 7, 2005

(51) Int. Cl.
 *H01M 8/04* (2006.01)
(52) U.S. Cl. ............... 429/23; 429/24; 429/26
(58) Field of Classification Search ........... 429/23, 429/26, 24
 See application file for complete search history.

(56) References Cited

U.S. PATENT DOCUMENTS

| | | | |
|---|---|---|---|
| 6,399,231 B1 * | 6/2002 | Donahue et al. | 429/13 |
| 6,451,466 B1 * | 9/2002 | Grasso et al. | 429/20 |
| 6,673,481 B1 * | 1/2004 | Reiser et al. | 429/13 |
| 6,887,599 B1 * | 5/2005 | Reiser et al. | 429/13 |
| 2003/0091882 A1 | 5/2003 | Schmidt et al. | |

FOREIGN PATENT DOCUMENTS

JP 06333586 12/1994

* cited by examiner

*Primary Examiner*—Patrick Joseph Ryan
*Assistant Examiner*—Thomas H. Parsons
(74) *Attorney, Agent, or Firm*—M. P. Williams

(57) ABSTRACT

An auxiliary load (148) for a fuel cell stack (102) is alternatively connected and disconnected from the fuel cell external circuit (177, 178) by a switch (200) in response to a switch control (201), repetitively, during startup and shutdown. The switch may be an insulated gate bipolar transistor (208) which is turned on and off by hunting between an upper limit voltage (207) and a lower limit voltage (208), which may be performed by compare circuits (205, 206), by the controller (202), or by commercially available voltage responsive hysteresis switches. Schedules of duty cycle as a function of cell stack voltage for startup (212) and shutdown (213) control a pulse width modulator (215) which operates the switch. Controls (229, 231) may limit the modulation so that the auxiliary load does not overheat, in response to temperature (221) of the load or a voltage/power model (235). The auxiliary load may comprise a heater in a water accumulator (247), an air intake (257) or an enthalpy recovery device (262).

19 Claims, 7 Drawing Sheets

FUEL CELL VOLTAGE CONTROL

TECHNICAL FIELD

This invention relates to a voltage limiting auxiliary load of a fuel cell stack which is periodically engaged in a fashion to simulate a load of a desired magnitude, optionally with temperature control, and in which the auxiliary load also provides heat to the stack, such as air or coolant, or to an oxidant energy recovery device.

BACKGROUND ART

U.S. patent application Ser. No. 10/305,301 filed Nov. 26, 2002 now U.S. Pat. No. 6,887,599 discloses the use of an auxiliary load selectively attached to the electrical output of a fuel cell stack to limit individual cell voltage resulting from introduction of reactants during startup and resulting from consumption of reactants during shutdown of the fuel cell power plant, as described with respect to FIG. 1.

In FIG. 1, a prior art fuel cell system 100 includes a fuel cell 102 comprising an anode 104, a cathode 106, and an electrolyte layer 108 disposed between the anode and cathode. The anode includes an anode substrate 110 having an anode catalyst layer 112 disposed thereon on the side of the substrate facing the electrolyte layer 108. The cathode includes a cathode substrate 114, having a cathode catalyst layer 116 disposed thereon on the side of the substrate facing the electrolyte layer 108. The cell also includes an anode flow field plate 118 adjacent the anode substrate 110, and a cathode flow field plate 120 adjacent the cathode substrate 114.

The cathode flow field plate 120 has a plurality of channels 122 extending thereacross adjacent the cathode substrate forming a cathode flow field for carrying an oxidant, such as air, across the cathode from an inlet 124 to an outlet 126. The anode flow field plate 118 has a plurality of channels 128 extending thereacross adjacent the anode substrate forming an anode flow field for carrying a hydrogen containing fuel across the anode from an inlet 130 to an outlet 132. Some cells also include a cooler 131 adjacent the cathode flow field plate 120 for removing heat from the cell, such as by using a water pump 134 to circulate water through a loop 132 that passes through the coolers 131, a radiator 136 for rejecting the heat, and a flow control valve or orifice 138. In some fuel cell systems the anode and cathode flow field plates and the cooler plate, such as the plates 118, 122 and 131, or the like are porous and used to both carry gases to the cell anode and cathode and to transport water into or away from each cell. In those systems, the coolant loop pump, such as the pump 134, should remain on during the shut-down procedure to prevent reactant channels from becoming blocked by coolant.

Although only a single cell 120 is shown, in actuality a fuel cell system comprises a plurality of adjacent cells (i.e., a stack of cells) connected electrically in series.

The fuel cell system includes a source 140 of hydrogen containing fuel, under pressure, a source 142 of air, an air blower 144, a primary electricity using device called a primary load 146, an auxiliary load 148, an anode exhaust recycle loop 150, and a recycle loop blower 152. During normal fuel cell operation, when the cell is providing electricity to the primary load 146, a primary load switch 154 is closed (it is shown open in the drawing), and an auxiliary load switch 156 is open. The air blower 144, anode exhaust recycle blower 152 and coolant pump 134 are all on, and a valve 166 in a fuel feed conduit from the fuel source 140 into the anode recycle loop 150 downstream of the recycle blower 152 is open, as is the valve 170 in the recycle loop 150 and the anode exhaust vent valve 172 in an anode exhaust conduit 174. An air inlet feed valve 158 in the conduit 160 is open. An air feed valve 162 in a conduit 164 from the air source 142 to a point in the recycle loop upstream of the recycle blower 152 is closed.

Thus, during normal operation, air from the source 142 is continuously delivered into the cathode flow field inlet 124 via the conduit 160 and leaves the cell outlet 126 via a conduit 176. Fresh hydrogen containing fuel from the pressurized source 140 is continuously delivered into the anode flow field via the conduit 168, which directs the fuel into the recycle loop 150. A portion of the anode exhaust, containing depleted fuel leaves the anode flow field through the vent valve 172 via the conduit 174, while the recycle blower 152 recirculates the balance of the anode exhaust through the anode flow field via the recycle loop in a manner well known in the prior art. The recycle flow helps maintain a relatively uniform gas composition from the inlet 130 to the outlet 132 of the anode flow field, as well as returning some water vapor to the cell to prevent dry-out of the cell in the vicinity of the fuel inlet. The hydrogen in the fuel electrochemically reacts in a well-known manner during normal cell operation to produce protons (hydrogen ions) and electrons. The electrons flow from the anode 104 to the cathode 106 through an external circuit 178 to power the load 146, while the protons flow from the anode 104 to the cathode 106 through the electrolyte 108.

To avoid significant cell performance decay as a result of corrosion of the cell catalyst and catalyst support, the following procedure may be used to shut down the cell: The switch 154 is opened, disconnecting the primary load from the external circuit. The valve 166 remains open permitting the flow of fuel to the anode flow field. The air inlet feed valve 158 is preferably closed, as well as the anode vent valve. The recycle flow valve 170 may remain open and the recycle blower 152 may remain on in order to continue to recirculate the anode exhaust through the cell. This prevents localized fuel starvation on the anode. The switch 156 is then closed, thereby connecting the small auxiliary resistive load 148 across the cell in the external circuit 177, 178. With the switch 156 closed, the usual cell electrochemical reactions continue to occur such that the oxygen concentration in the cathode flow field is reduced.

The valve 158 may be partially open during the period of auxiliary load application to prevent the pressure in the cathode chamber from dropping below ambient pressure.

The auxiliary load 148 is preferably sized to lower the cell voltage from its open circuit voltage of about 0.90–1.0 volts to about 0.20 volts in about 15 seconds to one minute. The size of the load necessary to accomplish this will depend upon the particulars of the cell design, such as number of cells, size of cells, and the maximum volume of hydrogen and air within the anode flow field and any fuel manifolds or the like and also within the cathode flow field and any air manifolds or the like, respectively. Because of the low level current production resulting from application of the auxiliary load prior to the commencement of the fuel purge, the magnitude of the "reverse currents" believed to cause cell performance decay during shut-down will be lower during the air purge step.

Once the cell voltage has been reduced by a predetermined amount (preferably to a cell voltage of 0.2 volts or less), the switch 156 may be opened, or it may remain closed, and the valve 166 is closed during all or part of the remainder of the shutdown procedure. The recycle valve 170 is closed and the recycle blower turned off to prevent further recirculation of the anode exhaust. The anode exhaust vent valve is opened, and the air flow valve 162 is then opened to allow air from the source 142 into the recycle loop immediately downstream of the valve 170 and just upstream of the recycle blower 152.

Assuming that the cell has been shut down in accordance with the foregoing procedure, there would only be dilute hydrogen and nitrogen within the anode and cathode flow fields. To restart the fuel cell system 100, the auxiliary load switch 156 is closed (if open) to connect the auxiliary load 148 in the external circuit 177, 178, the coolant loop valve 138, if closed, is opened and the pump 134 is turned on. The air flow valve 158 is closed; and the blower 144 is off. The anode exhaust vent valve 172 is open and the air flow valve in the conduit 162 is closed. The recycle flow valve 170 is also open, and the recycle blower 152 is on. The fuel flow valve 166 is opened to allow a flow of pressurized hydrogen from the source 140 into the anode flow field. The auxiliary load switch 156 is opened once hydrogen reaches the anode exhaust 172. The air flow valve 158 is opened, the air blower 144 is turned on, and the switch 154 is closed to connect the primary load across the cell 102. The cell may now be operated normally.

There are several problems with the prior art fixed auxiliary load voltage limiting function described hereinbefore. During startup, the fixed auxiliary load is connected to the fuel cell stack when the cell stack voltage rises above a predetermined level, and then is disconnected after a predetermined length of time, or, in some embodiments, after the DC current decays below a specified level. The load remains constant throughout that time.

If the same auxiliary load is used both for startup and shutdown, then either startup, shutdown or both will not be optimized as a result. During the shutdown process, a separate auxiliary load, with a different resistance and power rating may be connected to the fuel cell until the cell stack voltage decays below a specified level, after which it is disconnected. The use of two separate and distinct auxiliary loads for voltage limiting during startup and shutdown are costly to implement and package.

During startup, the anode fuel is introduced into the entire fuel cell stack in a fashion where it is not of a uniform concentration within each of the fuel cells, nor has is progressed the same amount through the fuel flow fields in each of the fuel cells. If current is drawn through a cell which does not have adequate fuel, the result is called "fuel starvation" which creates the negative voltages in an individual cell with inadequate fuel. Therefore, the open circuit cell stack voltage used to engage the auxiliary load must be set high enough to ensure that all cells have sufficient fuel. This results in many individual cells rising to a voltage level greater than that at which undesirable fuel cell decay mechanisms occur.

The prior art system is not sufficiently robust to accommodate variations between individual powerplants caused by manufacturing tolerances, or variations in powerplants that occur throughout the power plant operating lifetime. The control parameters used to connect and disconnect the auxiliary load must be conservative in order to avoid negative individual cell voltages. This means that many individual cells rise to a voltage level greater than desired to minimize cell decay mechanisms.

Auxiliary loads used for voltage limitation during startup and shutdown must be sized to dissipate the full energy generated by the fuel cell during these transition periods. Design must account for worst case environmental conditions, such as the temperature of the coolant and the temperature of the ambient environment, which results in costly over design compared with design adequate for normal, typical power plant operating conditions.

In utilizing either single auxiliary loads, or separate fixed auxiliary loads for startup and shutdown, mitigation of the over-voltage conditions and resulting decay in fuel cell performance has been sufficiently unsatisfactory so as to direct attention to formulation of fuel inlet manifolding systems, to provide a more uniform introduction of fuel to all the cells of a fuel cell stack. These systems are costly and too cumbersome for use in compact applications, such as in electric vehicles powered by a fuel cell power plant.

DISCLOSURE OF INVENTION

Objects of the invention include: avoiding complex fuel inlet manifold designs; simpler, lower cost and more effective packaging of voltage limiting devices for a fuel cell stack; use of a single voltage limiting auxiliary load for both startup and shutdown of a fuel cell stack; precise control over fuel cell stack voltage, during startup and shutdown; fuel cell stack voltage limiting that is tuneable to the startup and shutdown characteristics of individual fuel cell stacks, and tuneable to the variations in fuel cell stack characteristics across the operating life of each fuel cell stack; a voltage limiting capability which can accommodate tolerances in reactant flow rates and distribution, and tolerances in thermal characteristics of auxiliary loads used to limit voltages during fuel cell stack startup and shutdown; controlling temperature of a voltage limiting auxiliary load to protect it from damage and thereby allow maximum utilization thereof; providing temperature protection for voltage limiting auxiliary loads without the need for temperature sensing; avoiding heat waste when controlling voltages during startup and shutdown of fuel cell stacks with a voltage limiting auxiliary load; and reducing the number of components in a fuel cell power plant.

According to the present invention, a voltage limiting auxiliary load is cyclically switched into and out of a fuel cell stack external circuit so as to actively control the effective load across the fuel cell stack during startup and shutdown. The switching is controlled in one embodiment simply by hunting between lower and upper voltage limits. In other embodiments, the duty cycle of a pulse width modulation control is a function of the cell stack voltage. In still other embodiments, the duty cycle of a pulse width modulation control is further limited by a temperature of the auxiliary load, thereby permitting optimal performance while protecting it from damage; in one form, temperature is measured directly; in another form, a thermal model as a function of energy balance limits the duty cycle of the commanded pulse width modulation.

According to the invention further, a single voltage limiting auxiliary load is utilized both for startup and shutdown in a fuel cell stack. In other embodiments, the load may also serve as a heating element for the fuel cell stack, such as by heating the inlet air, the water in an accumulator, or the plates of an enthalpy recovery device.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
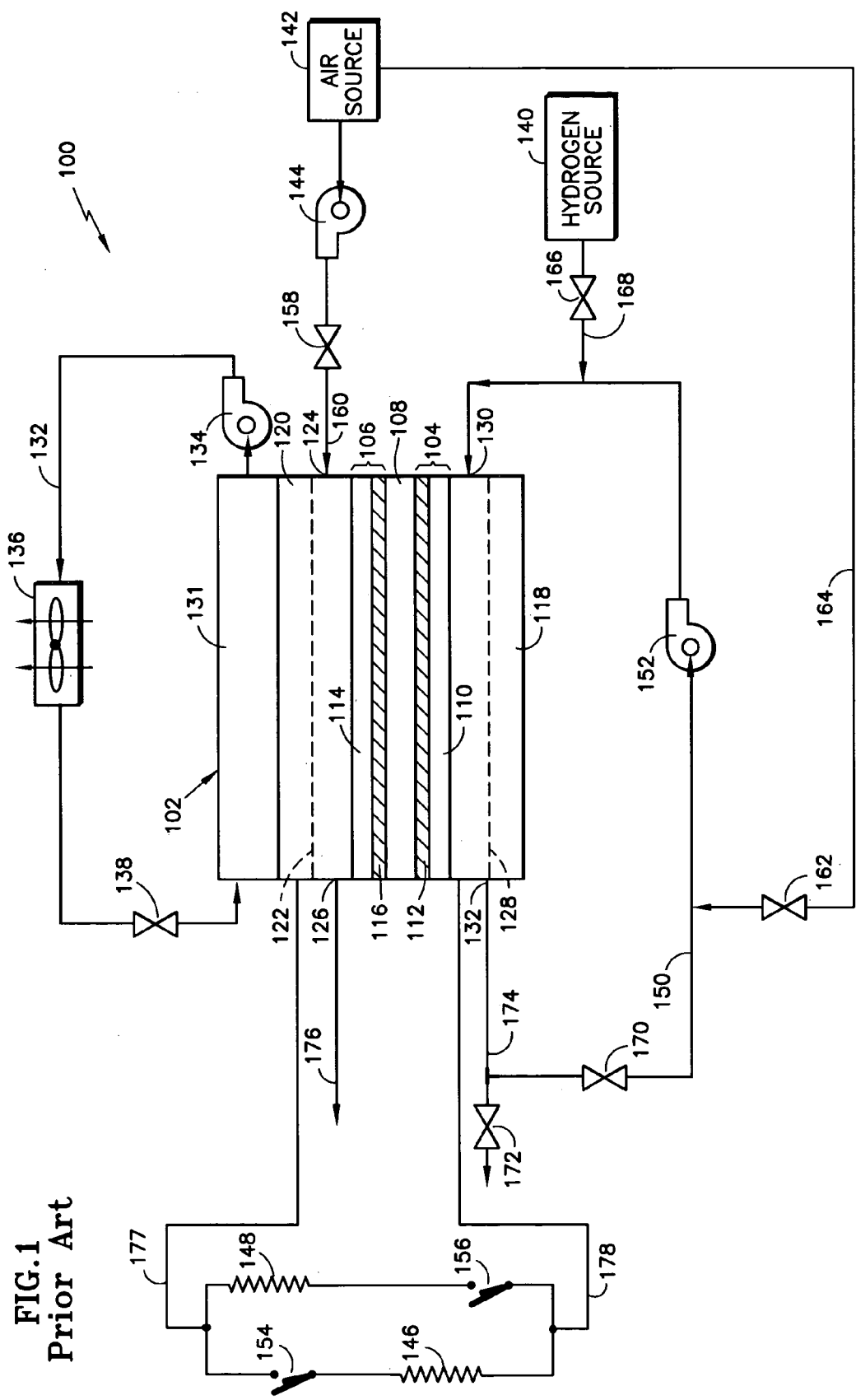
FIG. 1 is a schematic block diagram of a prior art fuel cell power plant employing a single voltage limiting auxiliary load resistor for both startup and shutdown.
Figure 2:
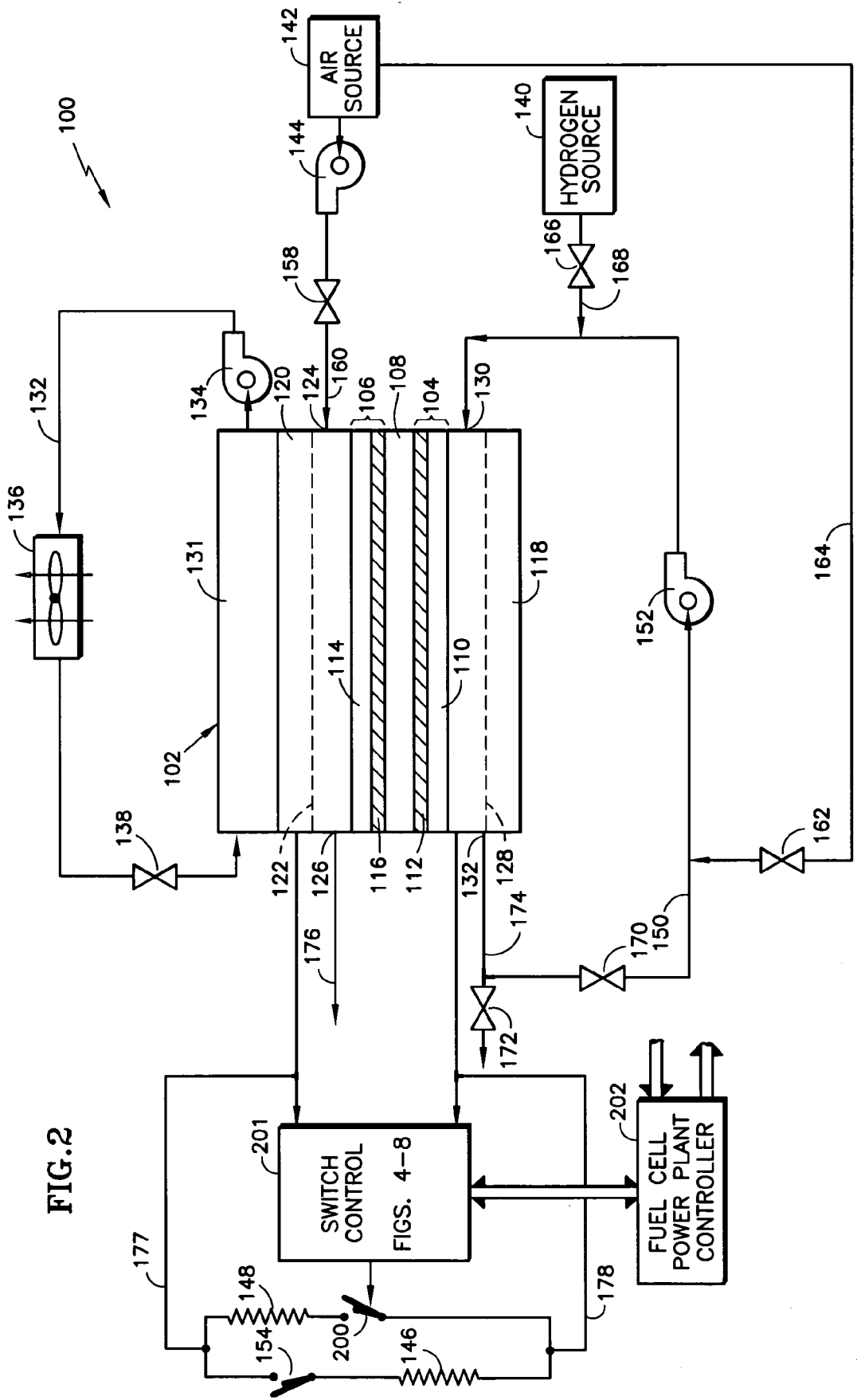
FIG. 2 is a schematic block diagram of a fuel cell power plant employing a switch and controls so as to periodically connect the voltage limiting auxiliary load into the external circuit of the fuel cell power plant in accordance with the invention.

Referring to FIG. 2, in accordance with the invention, a switch 200 is operated cyclically during fuel cell stack startup and during fuel cell stack shutdown, in response, at least, to the stack voltage between the external circuits 177, 178. A switch control 201 can take a variety of configurations which are illustrated in FIGS. 4–8. Various functions, such as enabling startup and shutdown procedures, are controlled by a processor based controller 202.

Figure 3:
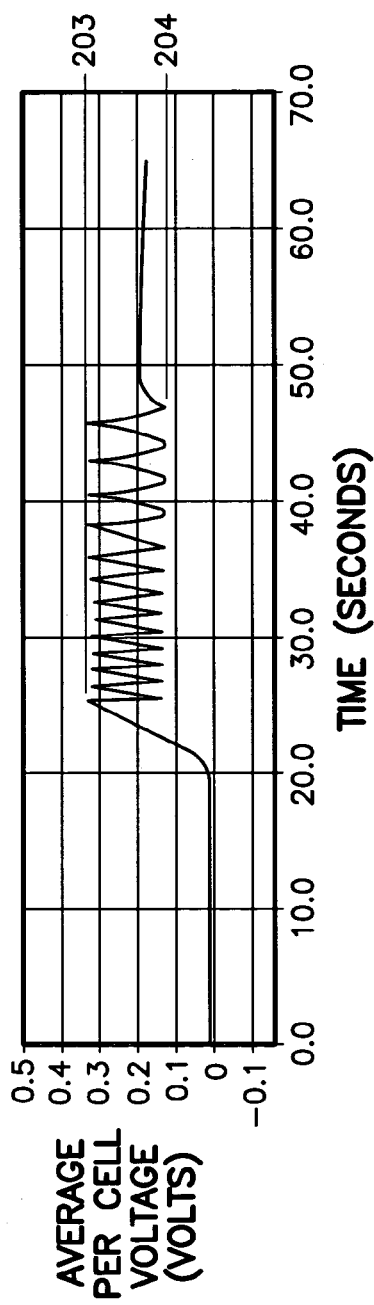
FIG. 3 is a plot of average per cell voltage of a fuel cell stack in which the voltage limiting auxiliary load is periodically switched in and out of the fuel cell stack external circuit.

A first configuration of the switch control 201 (as illustrated in FIG. 3) closes the switch 200 when the average voltage per cell in the stack reaches an upper limit 203, which may be on the order of 0.33 volts. The resultant current flow causes the voltage to decrease; and when the voltage decreases to a lower limit 204, which may be on the order of 0.13 volts, the switch 200 is once again opened.

Figure 4:
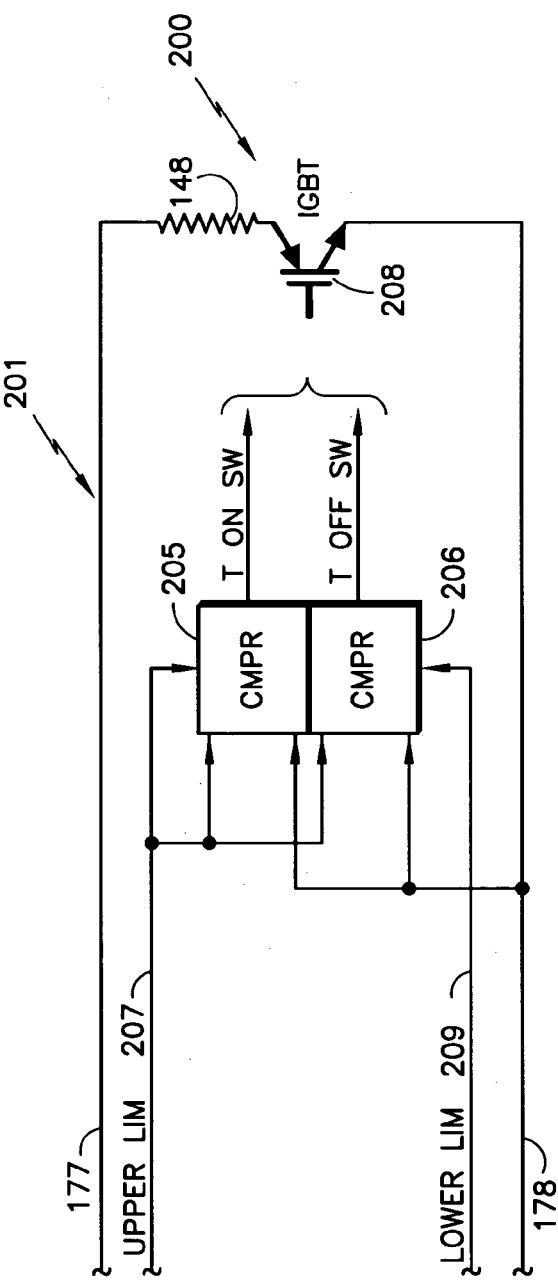
FIG. 4 is a simplified schematic illustration of voltage comparators that effect switching of the voltage limiting auxiliary load as illustrated in FIG. 3.

FIG. 4 is a simplified illustration of comparators 205, 206 comparing the cell stack voltage on the line 177 with an upper limit voltage on a line 207 to turn on an electronic switch, such as an insulated gate bipolar transistor (IGBT) 208, and comparing the cell stack voltage on the line 177 with a lower limit voltage on a line 209 to turn off the electronic switch 208 when the voltage reaches the lower limit, all as illustrated in FIG. 3. The upper and lower limits may be 0.4 volts per cell and 0.0 volts per cell, but preferentially may be 0.2 volts per cell and 0.1 volts per cell, respectively. In implementing the present invention, the functions illustrated in FIG. 4 to control the electronic switch 208 are performed by the microprocessor based controller 202.

The operation illustrated in FIG. 3 can also be performed by commercially available voltage responsive hysteresis switches provided by Eurotherm Action, Inc. (on the net at www.eurotherm.com and www.actionio.com), Model Nos. AP1080 and AP1090. These models are responsive to the upper or lower voltage level after 100 milliseconds to either open or close the corresponding switch; however, they are readily modified to be responsive to voltage levels after only 25 milliseconds.

Because the voltage levels appropriate for switching the auxiliary load in and out of the circuit may be different during startup from the appropriate voltage levels during shutdown, the upper and lower limits of FIG. 4 may be selected for shutdown in the one case and for startup in the other case. If the commercial switches, such as the AP1080 or AP1090, are utilized, separate switches may be enabled, each having an appropriate set of voltage limits, one being enabled during startup and the other being enabled during shutdown.

Figure 5:
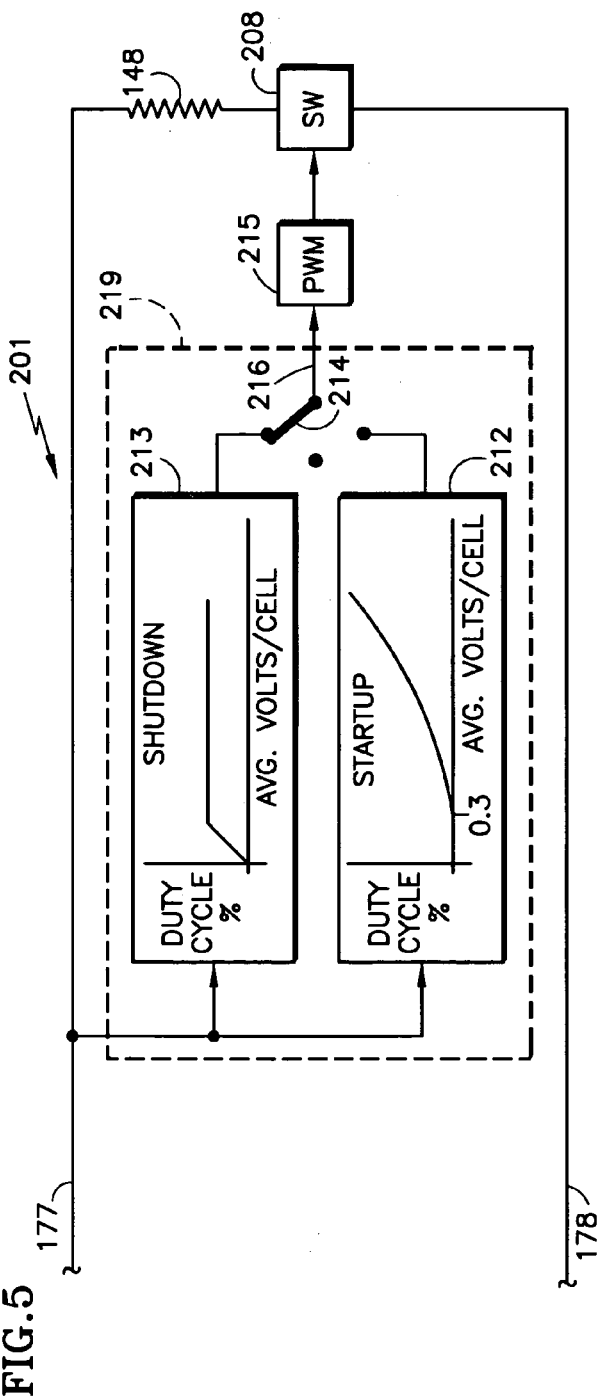
FIG. 5 is a schematic illustration of pulse width modulation control of an electronic switch responsive to different shutdown and startup duty cycle schedules, according to the invention.

FIG. 5 is a simplified schematic illustration of another form of switch control 201 which employs a startup schedule 212 and a shutdown schedule 213, the correct one of which is selected by a switch 214 to provide, to a pulse width modulation function 215, a voltage indicative of a correct duty cycle (that is, the percentage of time that the switch 208 shall be turned on versus the total percentage of time) to achieve the desired, average voltage limiting effect from the auxiliary load 148.

During startup, it is seen that no voltage limiting effect is required of the auxiliary load 148 until the average voltage per cell in the stack reaches about 0.3 volts. And then, the need to draw current from the cell and thereby avoid excessive voltages within the cells increases with time, until all of the fuel flow fields are totally filled with fuel and startup is therefore complete.

On the other hand, during shutdown, the duty cycle increases rapidly to a maximum duty cycle, selected to limit the maximum energy to the load. The precise duty cycle required from either of the schedules 212, 213 will depend upon the total design of the fuel cell stack itself as well as the magnitude of the auxiliary load 148.

The pulse width modulation function 215 is conventional, converting a voltage level received from the switch 214 into periodic gating-on pulses for the switch 208 so as to connect the auxiliary load 148 to the stack (177, 178) a desired percentage of the time. In this way, the effective auxiliary load is controlled by pulse width modulation. The duty cycle schedules 212, 213 along with the switch 214 are hereinafter referred to as a modulation control 219, indicated by the dotted line in FIG. 5.

Figure 6:
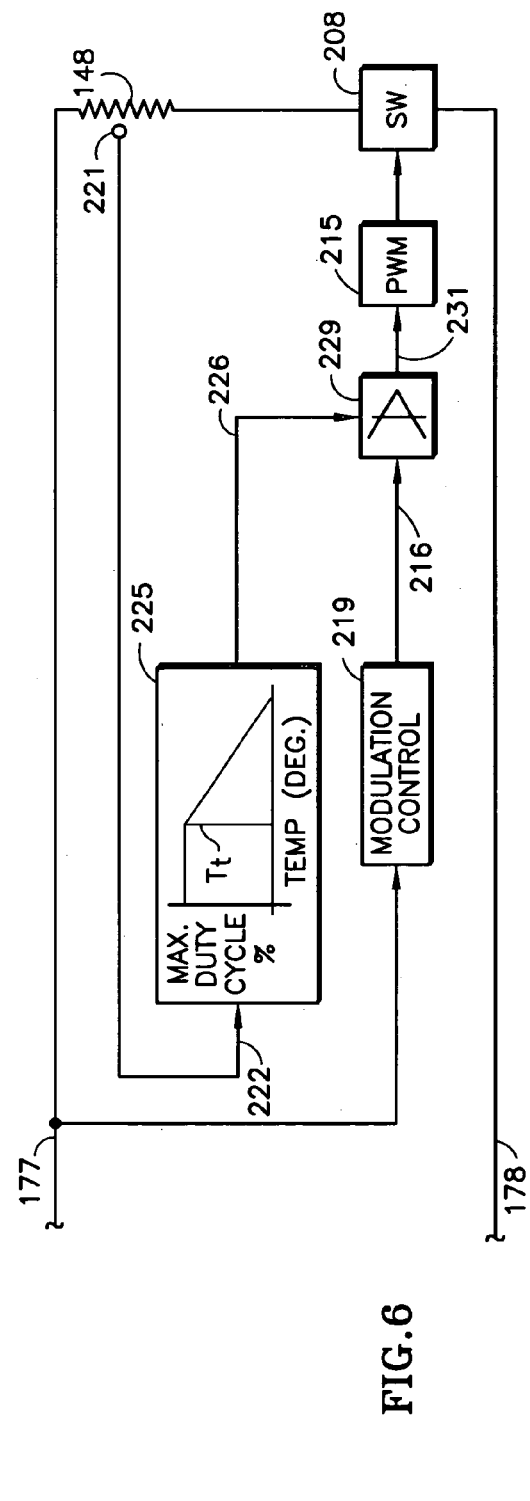
FIG. 6 is a schematic illustration of pulse width modulation switching of a voltage limiting auxiliary load with temperature responsive limit to the maximum duty cycle.

In FIG. 6, the temperature of the auxiliary load 148 is monitored by a temperature sensor 221 to provide a temperature signal on a line 222 as input to a maximum duty cycle schedule 225. So long as the temperature does not exceed a threshold temperature, Tt, the duty cycle of the switch 208 may be as high as 100%, insofar as the temperature control is concerned. When the threshold temperature is exceeded, then the maximum duty cycle is decreased as a function of temperature as shown in the schedule 225. The output of the schedule 225 is provided on the line 226 to a variable limit function 229, sometimes referred to as a "not greater" function, in which the limit is controlled by the signal on a line 226.

The signal on the line 216 from the modulation control 219 (described with respect to FIG. 5) will be passed unaffected through the limit function 229 on a line 231 to the pulse width modulation control 215 unless and until the temperature of the auxiliary load 148 exceeds the threshold temperature. Then, the signal on the line 213 will be limited to be not greater than the signal on the line 226. In this way, the auxiliary load 148 will not be connected to the cell stack with a sufficiently high duty cycle to cause it to overheat. This is another significant aspect of the present invention.

Figure 7:
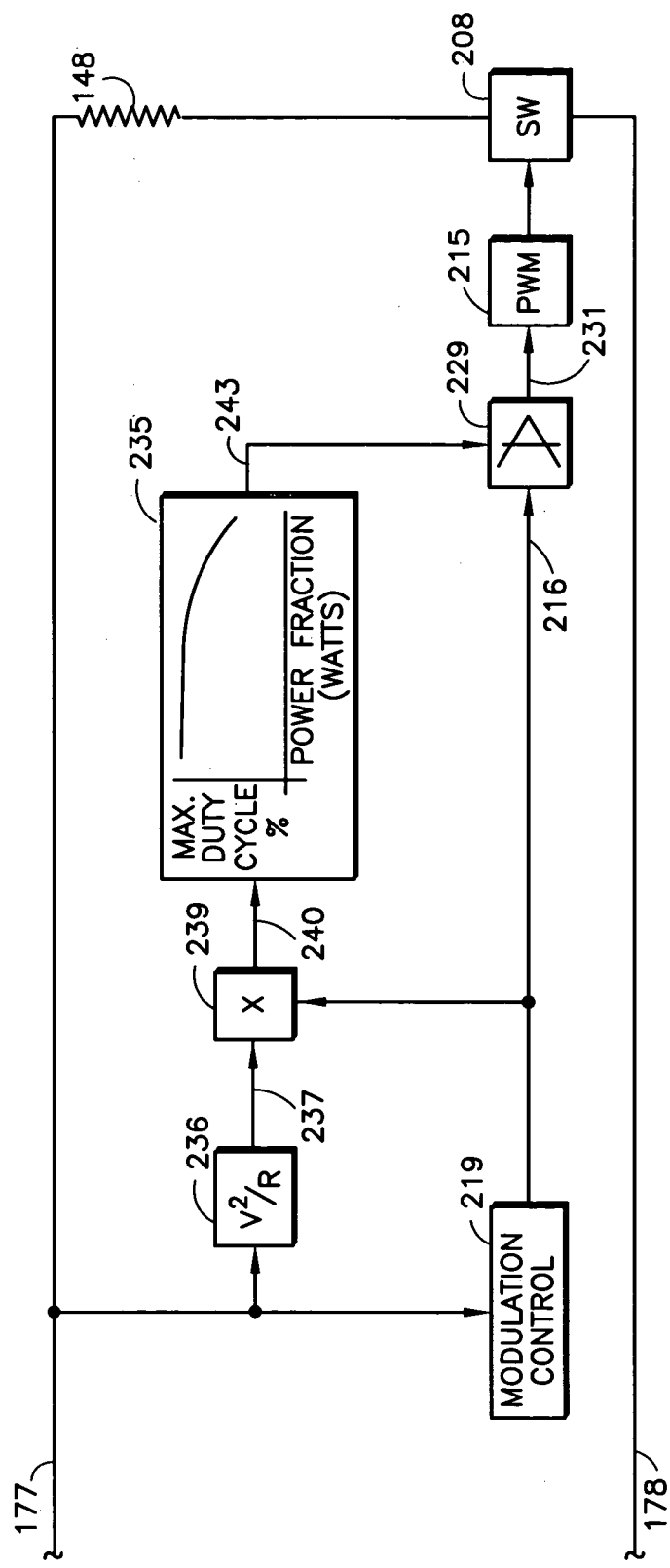
FIG. 7 is a schematic illustration of pulse width modulation control of a voltage limiting auxiliary load switch using a temperature model to limit the maximum duty cycle.

In FIG. 7, instead of using a temperature sensor to monitor the temperature of the auxiliary load 148 (as in FIG. 6), a thermal model 235 is used. First, in a function 236, the stack voltage is squared and divided by the resistance of the auxiliary load 148 to provide a signal on a line 237 representing the peak power being consumed by the auxiliary load 148. The duty cycle commanded by the modulation control 219 is then used in a function 239 to provide a signal on a line 240 which is a fraction of the power, as determined by the present duty cycle determined by the modulation control 219.

The signal on the line 240, which represents the average power, proportional to the percent of time that the load is connected, is applied to the thermal model 235, of which will determine a signal on a line 243 which is applied to the "not greater than" limit circuit 229. In this way, the duty cycle of the PWM signal is controlled to limit the maximum temperature of the auxiliary load as predicted by an energy balance model. The model includes energy dissipation capability calculations and requires measured or assumed temperatures and flow of coolant air or water.

Figure 8:
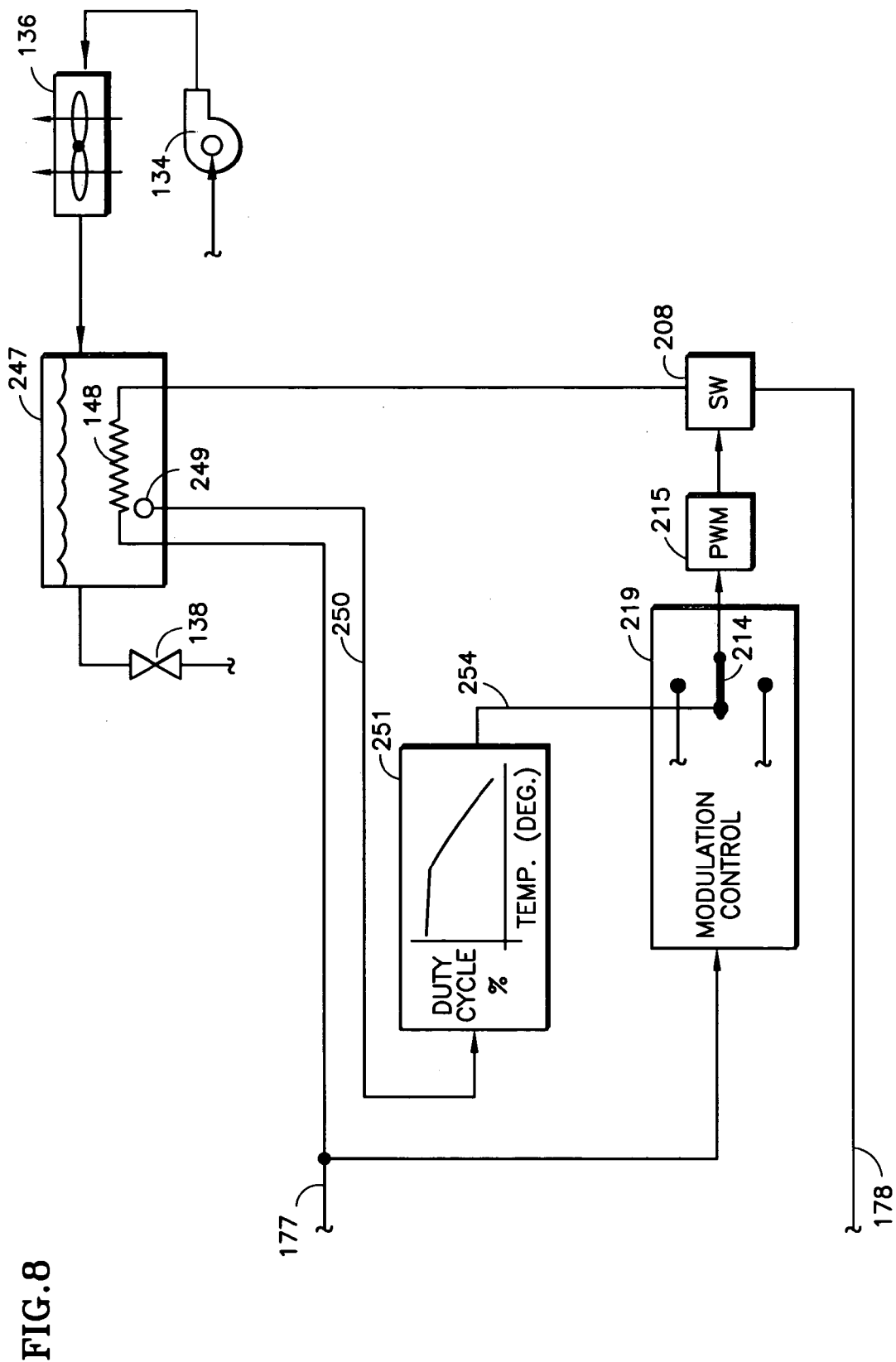
FIG. 8 is a schematic illustration of a switched, voltage limiting auxiliary load which functions as a heater in a fuel cell stack water accumulator.

According to another aspect of the present invention, the auxiliary load 148 may be used to help in heating and/or controlling the temperature of the fuel cell stack in a variety of ways. In the example of FIG. 8, a water accumulator is interposed between the radiator 136 and the flow control valve or orifice 138. The auxiliary load 148 is a heater disposed within the accumulator 247. Because of the fact that the modulation control can cause an average, effective load by virtue of the manner in which the switch 208 is operated, as described hereinbefore, sizing of the auxiliary load 148 to be an appropriate heater is no problem. In FIG. 8, a temperature sensor 249 senses the temperature of the water in the accumulator and provides a temperature signal on a line 250 to a schedule 251 of desired duty cycle as a function of temperature. The output on a line 254 is applied to the central terminal of the switch 214 within the modulation control 219. Thus, the pulse width modulation circuit 215 will respond either to a shutdown schedule, a startup schedule, or a temperature schedule, in dependence on the setting of the switch 214.

Typically, the embodiment of the invention illustrated schematically in FIG. 8 will be implemented in the controller 202 by additional software routines, utilizing ordinary programming concepts well within the skill of the art.

Figure 9:
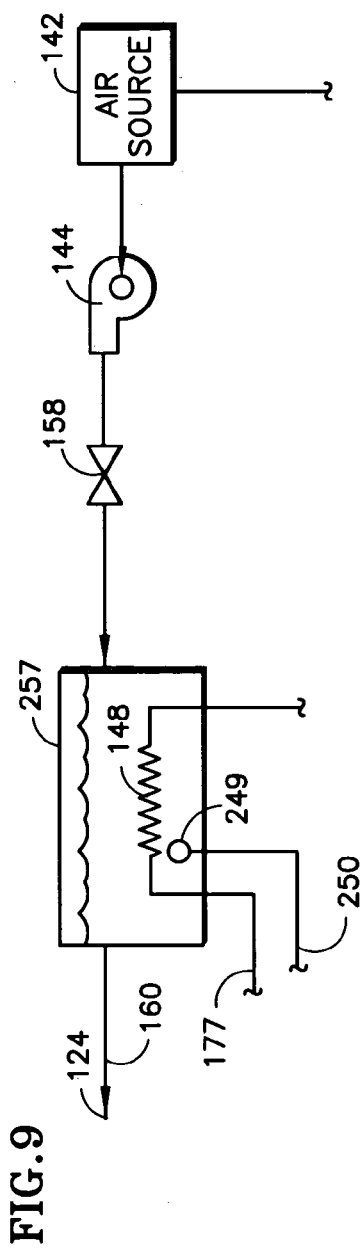
FIG. 9 is a fractional, schematic illustration of a switched, voltage limiting auxiliary load used as a heater in the air inlet of a fuel cell stack.

Instead of warming the water in an accumulator 247 as illustrated in FIG. 8, the auxiliary load 148 may be within a heat exchange device 257 as shown in FIG. 9 interposed between the air inlet feed valve 158 and the air inlet 124. The temperature sensor 249 thereby senses the temperature of the inlet air, and control may be as diagrammatically illustrated in FIG. 8.

Figure 10:
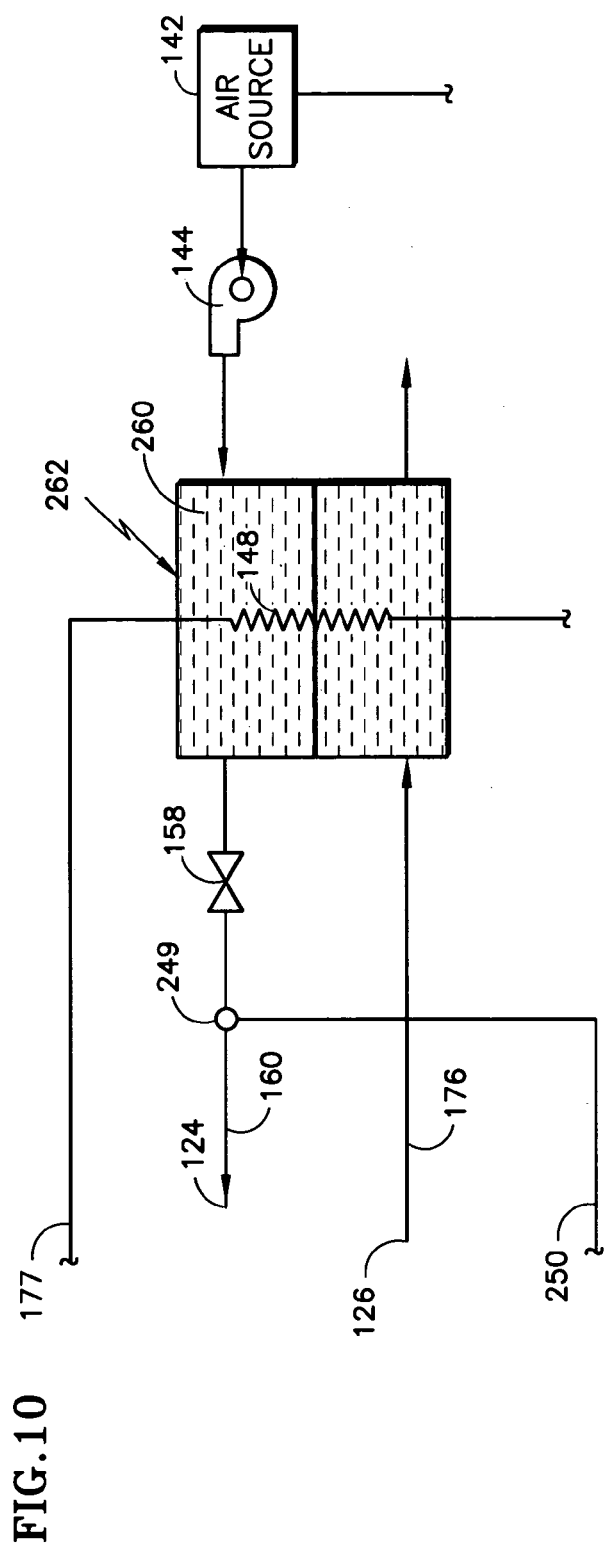
FIG. 10 is a fractional, schematic illustration of a switched, voltage limiting auxiliary load which comprises the conductive graphite composite plates of an enthalpy recovery device in the air circuit of a fuel cell power plant.

Another aspect of the invention illustrated briefly in FIG. 10 utilizes the conductive graphite composite plates 260 (represented by dash lines) within an enthalpy recovery device 262 as the auxiliary load for limiting voltage on startup and shutdown. In FIG. 10, the auxiliary load 148 is illustrative only, for consistency; the resistance actually is the summation of resistances of the series of conductive graphite composite plates 260. A temperature sensor 249 may be within the air inlet conduit 160 to provide the signal on the line 250. Control may then be as that described hereinbefore with respect to FIG. 8.

It should be clear that the ability to tailor operation, particularly the schedules 212, 213 (FIG. 5), so as to accommodate different individual fuel cell power plants and to accommodate variations in a given fuel cell as it ages through use, is provided by the present invention, and is an important feature thereof.

Although the invention is described in embodiments which respond to the voltage of the electrical output of the fuel cell stack, the invention may respond to other characteristics of the stack electrical output.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant, comprising:
a plurality of fuel cells serially connected in a stack having a pair of external circuit output terminals;
a voltage limiting auxiliary load, disposed to dissipate heat in an element of said fuel cell power plant so as to raise the temperature of said element;
a switch connected in series with said auxiliary load between said terminals; and
switch control means operable during fuel cell stack operation transitions selected from startup and shutdown for causing said switch to alternatively (a) connect said auxiliary load between said terminals, (b) disconnect said auxiliary load from at least one of said terminals, repetitively during at least one of said transitions, in response to electrical output of said fuel cell stack, and operable during periods of time exclusive of start up and shutdown in response to temperature resulting from heat dissipated by said auxiliary load in said element.

2. A fuel cell power plant, comprising:
a plurality of fuel cells serially connected in a stack having a pair of external circuit output terminals;
a voltage limiting auxiliary load;
a switch connected in series with said auxiliary load between said terminals; and
switch control means operable during fuel cell stack operation transitions selected from startup and shutdown for causing said switch to alternatively (a) connect said auxiliary load between said terminals and (b) disconnect said auxiliary load from at least one of said terminals, repetitively during at least one of said transitions.

3. A power plant according to claim 2 wherein:
said switch control means is operable in response to electrical output of said fuel cell stack.

4. A power plant according to claim 2 wherein:
said switch control means comprises pulse width modulation responsive to a function of the voltage across said terminals.

5. A power plant according to claim 4 wherein:
said function is at least one schedule of desired duty cycle as function of the voltage across said terminal.

6. A power plant according to claim 5 wherein:
said function is a first schedule during startup and a second schedule, different from said first schedule, during shutdown.

7. A power plant according to claim 4 wherein:
said switch control means limits said duty cycle in response to a function of power dissipated in said auxiliary load.

8. A power plant according to claim 2 wherein:
said switch control means limits the amount of time that said switch connects said auxiliary load between said terminals in response to a function of power dissipated in said auxiliary load.

9. A power plant according to claim 2 wherein:
said switch control means causes said switch to connect said auxiliary load between said terminals in response to the voltage across said terminals reaching 0.4 volts per cell; and
said switch control means causes said switch to disconnect said auxiliary from at least one of said terminals in response to the voltage across said terminals reaching 0.0 volts per cell.

10. A power plant according to claim 2 wherein:
said switch control means causes said switch to connect said auxiliary load between said terminals in response to the voltage across said terminals reaching 0.2 volts per cell; and
said switch control means causes said switch to disconnect said auxiliary from at least one of said terminals in response to the voltage across said terminals reaching 0.1 volts per cell.

11. A power plant according to claim 2 further comprising:
temperature means for providing a signal indicative of the temperature of said auxiliary load; and wherein:
said switch control means limits the amount of time that said switch connects said auxiliary load between said terminals in response to said signal indicating a temperature in excess of a threshold temperature.

12. A power plant according to claim 2 wherein:
said switch control means causes said switch to connect said auxiliary load between said terminals in response to the voltage across said terminals reaching an upper limit voltage and causes said switch to disconnect said auxiliary load from at least one of said terminals in response to the voltage across said terminals reaching a lower limit voltage.

13. A power plant according to claim 12 wherein:
said upper voltage limit is 0.4 volts per cell and said lower voltage limit is 0.0 volts per cell.

14. A power plant according to claim 12 wherein:
said upper voltage limit is 0.2 volts per cell and said lower voltage limit is 0.1 volts per cell.

15. A fuel cell power plant, comprising:
a plurality of fuel cells serially connected in a stack having a pair of external circuit output terminals;
a voltage limiting auxiliary load, disposed to dissipate heat in an element of said fuel cell power plant so as to raise the temperature of said stack;
a switch connected in series with said auxiliary load between said terminals; and
switch control means operable to control said switch (a) during transitions selected from startup and shut down in response to electrical output of said fuel cell stack and (b) during periods of time exclusive of start up and shut down in response to temperature resulting from heat dissipated by said auxiliary load in said element.

16. A power plant according to claim 15 wherein:
said element is a water accumulator in said fuel cell power plant.

17. A power plant according to claim 15 wherein:
said element conducts oxidant toward said fuel cell stack.

18. A power plant according to claim 15 wherein:
said element is an enthalpy recovery device in said fuel cell power plant.

19. A power plant according to claim 18 wherein:
said auxiliary load comprises conductive graphite composite plates in said enthalpy recovery device.

* * * * *